US012498239B2

United States Patent
Wu et al.

(10) Patent No.: US 12,498,239 B2
(45) Date of Patent: Dec. 16, 2025

(54) SYSTEM FOR EXTENDED REALITY AUGMENTATION OF SITUATIONAL NAVIGATION

(71) Applicant: AT&T Intellectual Property I, L.P., Atlanta, GA (US)

(72) Inventors: Qiong Wu, Bridgewater, NJ (US); Aritra Guha, Edison, NJ (US); Eric Zavesky, Austin, TX (US); Wen-Ling Hsu, Bridgewater, NJ (US); Zhengyi Zhou, Chappaqua, NY (US); Louis Alexander, Franklin, NJ (US); Jean-Francois Paiement, Palm Desert, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 238 days.

(21) Appl. No.: 17/807,216

(22) Filed: Jun. 16, 2022

(65) Prior Publication Data

US 2023/0408283 A1    Dec. 21, 2023

(51) Int. Cl.
*G01C 21/36*     (2006.01)
*B60W 60/00*    (2020.01)
(Continued)

(52) U.S. Cl.
CPC ..... *G01C 21/3635* (2013.01); *B60W 60/0051* (2020.02); *G01C 21/365* (2013.01); *G06T 19/006* (2013.01); *G08G 1/0969* (2013.01)

(58) Field of Classification Search
CPC ...... G02B 27/01; G02B 27/014; G01C 21/36; G01C 21/3632; G01C 21/3635;
(Continued)

(56) References Cited

U.S. PATENT DOCUMENTS

| | | | | |
|---|---|---|---|---|
| 7,216,035 B2 * | 5/2007 | Hortner | .............. | G01C 21/3647 701/28 |
| 10,618,523 B1 * | 4/2020 | Fields | ............. | B60W 60/00182 |

(Continued)

FOREIGN PATENT DOCUMENTS

| | | | | |
|---|---|---|---|---|
| DE | 102009046908 A1 * | 5/2011 | ........... | G01C 21/365 |
| DE | 102012103293 A1 * | 10/2013 | ............. | B60Q 1/143 |

(Continued)

OTHER PUBLICATIONS

EPO machine translation of DE 102009046908 A1 (original DE document published May 26, 2011) (Year: 2011).*

(Continued)

*Primary Examiner* — David A Testardi
(74) *Attorney, Agent, or Firm* — Guntin & Gust, PLC; Ralph Trementozzi

(57) ABSTRACT

Extended reality augmentation of situational navigation (e.g., using a computerized tool) is enabled. For example, a system can comprise: a processor and a memory that stores executable instructions that, when executed by the processor, facilitate performance of operations, comprising: based on a route of a vehicle, determining a navigational instruction to be displayed via an augmented reality interface of the vehicle, and displaying the navigational instruction via the augmented reality interface, wherein displaying the navigational instruction comprises displaying a virtual leading vehicle to be followed by the vehicle.

20 Claims, 13 Drawing Sheets

(51) Int. Cl.
  *G06T 19/00* (2011.01)
  *G08G 1/0969* (2006.01)
(58) Field of Classification Search
  CPC . G01C 21/365; B60W 50/14; B60W 60/0051; B60W 60/0059; G05D 1/0061; G05D 1/81; G05D 1/817
  See application file for complete search history.

(56) References Cited

U.S. PATENT DOCUMENTS

| | | | | |
|---|---|---|---|---|
| 10,967,871 | B1* | 4/2021 | Marti | B60W 40/08 |
| 11,254,270 | B1* | 2/2022 | Li | B60K 35/10 |
| 2002/0055808 | A1* | 5/2002 | Matsumoto | G01C 21/365 348/148 |
| 2005/0071082 | A1* | 3/2005 | Ohmura | G01C 21/365 340/995.19 |
| 2006/0085125 | A1* | 4/2006 | Shibata | G01C 21/365 701/414 |
| 2006/0100774 | A1* | 5/2006 | Barkowski | G01C 21/365 701/532 |
| 2007/0067089 | A1* | 3/2007 | Yoshida | G02B 27/0101 701/96 |
| 2010/0157430 | A1* | 6/2010 | Hotta | G02B 27/01 359/630 |
| 2010/0253541 | A1* | 10/2010 | Seder | G08G 1/0962 340/905 |
| 2010/0292886 | A1* | 11/2010 | Szczerba | G01S 13/723 701/31.4 |
| 2013/0289875 | A1* | 10/2013 | Kumon | G01C 21/365 701/533 |
| 2014/0159886 | A1* | 6/2014 | Hasegawa | B60W 50/14 340/435 |
| 2014/0268353 | A1* | 9/2014 | Fujimura | G02B 27/0101 359/630 |
| 2015/0149021 | A1* | 5/2015 | Duncan | B60W 60/0051 701/23 |
| 2015/0226568 | A1* | 8/2015 | Ann | G01C 21/36 701/400 |
| 2015/0291160 | A1* | 10/2015 | Kim | B60W 30/16 345/633 |
| 2016/0124225 | A1* | 5/2016 | Kwak | G02B 27/0101 348/115 |
| 2017/0106876 | A1* | 4/2017 | Gordon | B60W 60/0059 |
| 2018/0053415 | A1* | 2/2018 | Krunic | G08G 1/096838 |
| 2018/0058879 | A1* | 3/2018 | Tayama | B60W 30/16 |
| 2018/0105040 | A1* | 4/2018 | Ryu | G08G 1/096791 |
| 2018/0196427 | A1* | 7/2018 | Majumdar | G05D 1/0061 |
| 2018/0197039 | A1* | 7/2018 | Guerreiro | B60K 35/00 |
| 2018/0322715 | A1* | 11/2018 | Toyoda | G02B 27/0101 |
| 2019/0009792 | A1* | 1/2019 | Soderlind | B60W 30/12 |
| 2019/0066382 | A1* | 2/2019 | Kubo | G01C 21/365 |
| 2019/0071075 | A1* | 3/2019 | Mimura | G06V 20/58 |
| 2019/0101405 | A1* | 4/2019 | Feng | G08G 1/0969 |
| 2019/0146486 | A1* | 5/2019 | Doster | G05D 1/0027 701/29.3 |
| 2019/0179305 | A1* | 6/2019 | Magzimof | G05D 1/0038 |
| 2019/0299855 | A1* | 10/2019 | Ostapenko | B60W 30/16 |
| 2020/0031283 | A1* | 1/2020 | Nakasho | G08G 1/16 |
| 2020/0171951 | A1* | 6/2020 | Matsumoto | G08G 1/0962 |
| 2020/0207272 | A1* | 7/2020 | Matsuo | G01C 21/36 |
| 2020/0215917 | A1* | 7/2020 | Schöning | B60W 40/09 |
| 2020/0371351 | A1* | 11/2020 | Chang | B60K 35/23 |
| 2021/0009117 | A1* | 1/2021 | Emura | G08G 1/16 |
| 2021/0174767 | A1* | 6/2021 | Edgren | G02B 27/01 |
| 2021/0300428 | A1* | 9/2021 | Stent | B60W 10/04 |
| 2022/0114988 | A1* | 4/2022 | Prakah-Asante | B60K 35/85 |
| 2022/0144296 | A1* | 5/2022 | Seitz | G06V 20/588 |
| 2022/0348195 | A1* | 11/2022 | Mangal | B60W 50/14 |
| 2023/0173919 | A1* | 6/2023 | Kim | B60K 35/00 701/36 |
| 2023/0186593 | A1* | 6/2023 | Tryndin | G06V 10/60 315/82 |
| 2023/0204373 | A1* | 6/2023 | Lee | G06V 20/588 701/436 |
| 2023/0286524 | A1* | 9/2023 | Lu | B60W 50/082 |
| 2023/0373504 | A1* | 11/2023 | Diamond | B60W 60/0051 |

FOREIGN PATENT DOCUMENTS

| | | | | |
|---|---|---|---|---|
| DE | 102014208392 A1 * | 11/2015 | | G01C 21/365 |
| DE | 102018214938 A1 * | 3/2020 | | |
| DE | 102019129105 A1 * | 4/2021 | | |
| DE | 102020102700 A1 * | 8/2021 | | |
| EP | 3306523 A1 | 4/2018 | | |
| JP | 2005106663 A * | 4/2005 | | |
| JP | 2005107917 A * | 4/2005 | | |
| JP | 2006284195 A * | 10/2006 | | |
| JP | 2019045190 A * | 3/2019 | | |
| JP | 2019120652 A * | 7/2019 | | |
| JP | 2020159768 A * | 10/2020 | | |
| KR | 20190136633 A * | 12/2019 | | |
| KR | 20200103463 A * | 9/2020 | | |
| KR | 20230084809 A * | 6/2023 | | |
| WO | WO-2015045112 A1 * | 4/2015 | | B60K 31/00 |
| WO | WO-2019053927 A1 * | 3/2019 | | |
| WO | WO-2022224311 A1 * | 10/2022 | | |

OTHER PUBLICATIONS

Wikipedia article, "Extended reality", Old revision dated May 25, 2022, 2 pages (Year: 2022).*
EPO machine translation of DE 102018214938A1 (original DE document published Mar. 5, 2020) (Year: 2020).*
Sick product information, "Glare"—Glare Sensors, Redefining Polished Performance, 8017834/2016-03-29, 1M-Pre USmod en44, Mar. 29, 2016, 20 pages (Year: 2016).*
Hong, D. | "Navigation and GPS Through Augmented Reality", webpage https://medium.com/@dylanhongtech/navigation-and-gps-through-augmented-reality-cd8012dfc8f2, Nov. 9, 2018, 4 pages.
Dent, S. | "Google Maps' AR walking directions comes to many more phones", webpage https://www.engadget.com/2019-08-08-google-maps-ar-walking-directions-live-view.html, Aug. 8, 2019, 5 pages.

* cited by examiner

SYSTEM FOR EXTENDED REALITY AUGMENTATION OF SITUATIONAL NAVIGATION

TECHNICAL FIELD

The disclosed subject matter relates to vehicle navigation and, more particularly, to extended reality augmentation of situational navigation.

BACKGROUND

Navigation systems for use in vehicles have become increasingly commonplace. Most new vehicles at least optionally include an in-vehicle navigation system, and those that do not can typically be augmented with a smartphone-based navigation system. Such conventional navigation systems typically utilize a combination of verbal and written instruction along with an arrow on a map. Some conventional navigation systems indicate which highway sign to follow, in order to stay on route, by overlaying an image of the navigation sign overtop a representation of a multi-lane highway. However, it can still be difficult to follow conventional navigation system instructions, increasing the chance of missing a highway exit or a turn. Complex intersections, or low-visibility conditions can hinder a user's ability to follow conventional navigational instructions.

The above-described background relating to vehicle navigation is merely intended to provide a contextual overview of some current issues and is not intended to be exhaustive. Other contextual information may become further apparent upon review of the following detailed description.

DETAILED DESCRIPTION

Figure 1:
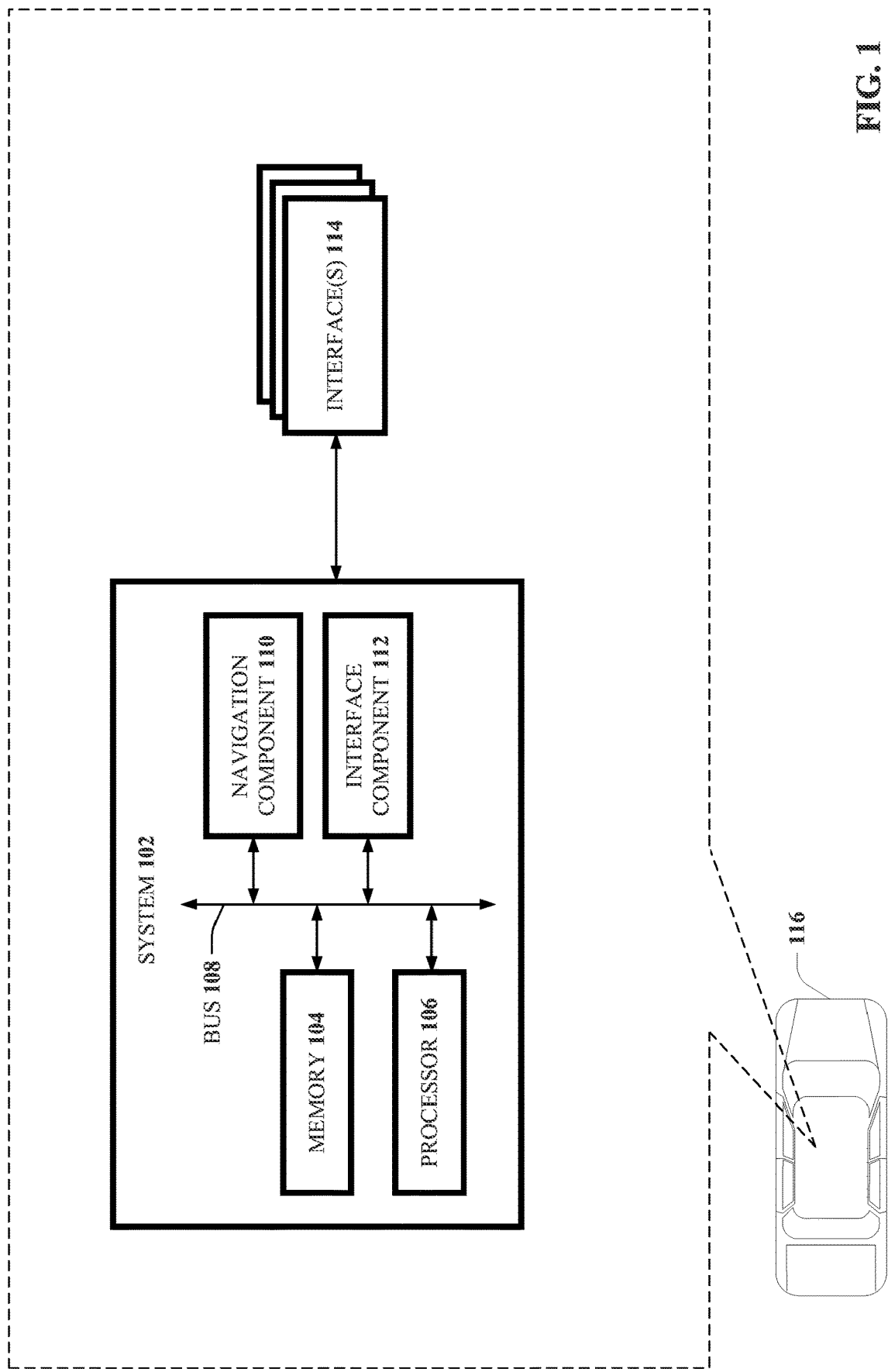
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, vehicle navigation can be improved in various ways, and various embodiments are described herein to this end and/or other ends.

According to an embodiment, a system can comprise a processor, and a memory that stores executable instructions that, when executed by the processor, facilitate performance of operations, comprising: based on a route of a vehicle, determining a navigational instruction to be displayed via an augmented reality interface of the vehicle, and displaying the navigational instruction via the augmented reality interface, wherein displaying the navigational instruction comprises displaying a virtual leading vehicle to be followed by the vehicle.

In one or more embodiments, a type of the virtual leading vehicle can be determined based on a biometric indicator of an occupant of the vehicle. In further embodiments, a type of the virtual leading vehicle can be determined based on a preference associated with a user profile registered with the vehicle.

In various implementations, the above-operations can further comprise: based on an output of a sensor of the vehicle, determining a potential collision. In this regard, the navigational instruction can be further based on the potential collision.

In additional embodiments, the above-operations can further comprise: based on an output of a sensor of the vehicle, determining a potential glare on a surface of the vehicle. In this regard, the navigational instruction can be further based on the potential glare on the surface of the vehicle.

In some embodiments, the above-operations can further comprise: determining a weather condition along the route of the vehicle. In this regard, the navigational instruction can be further determined based on the weather condition.

In one or more embodiments, the above-operations can further comprise: generating a virtual representation of the vehicle on a virtual representation of a road on which the vehicle travels. In this regard, displaying the navigational instruction can comprise displaying the virtual representation of the vehicle following the virtual leading vehicle.

In some implementations, the above-operations can further comprise: determining, based on a defined danger criterion, a danger level associated with the navigational instruction. In this regard, a color of the virtual leading vehicle can be determined based on the danger level.

In various embodiments, the above-operations can further comprise: determining, based on a user profile of a user of the vehicle, a driver skill level. In this regard, the user profile can be generated using a user profile model. Further in this regard, the user profile model can be generated using machine learning based on past driving activities of one or more users of the vehicle. In further embodiments, the above-operations can further comprise: determining, based on the driver skill level, whether to initiate automated navigation of the vehicle, and in response to a result of the determining whether to initiate the automated navigation being to initiate the automated navigation, executing the automated navigation of the vehicle. In additional embodiments, determining whether to initiate the automated navigation of the vehicle can be further based on a current or predicted road condition along the route of the vehicle.

In another embodiment, a non-transitory machine-readable medium can comprise executable instructions that, when executed by a processor, facilitate performance of operations, comprising: based on a course of a vehicle, determining a navigational direction to be presented via an extended reality interface of the vehicle, and presenting the navigational direction via the extended reality interface, wherein presenting the navigational direction comprises presenting a virtual leading vehicle to be followed by the vehicle.

In various embodiments, the above-operations can further comprise: determining a capability of the vehicle. In this regard, the navigational direction can be further determined based on the capability of the vehicle.

In another embodiment, the above-operations can further comprise: based on a road on which the vehicle travels or is instructed to travel and based on an attribute of the vehicle, determining a limitation of the vehicle. In this regard, the navigational direction can be further based on the limitation of the vehicle. In some embodiments, the attribute can comprise a weight of the vehicle or a size of the vehicle.

According to yet another embodiment, a method can comprise: based on a route of a vehicle, determining, by a system comprising a processor, a navigational instruction to be displayed via an augmented reality interface of the vehicle, and displaying, by the system via a display interface of the vehicle, the navigational instruction, wherein displaying the navigational instruction comprises displaying a virtual leading vehicle to be followed by the vehicle.

In various embodiments, the display interface can comprise a first display interface associated with a driver of the vehicle, and the method can further comprise: displaying, by the system via a second display interface associated with a passenger of the vehicle, a visualization associated with the route of the vehicle.

In one or more embodiments, the above-method can further comprise: receiving, by the system, request data representative of a request of a passenger of the vehicle. In this regard, the visualization can be further based on the request of the passenger of the vehicle.

In some embodiments, the visualization can be further based on a destination of the vehicle.

In various implementations, the first display interface can comprise a first augmented reality display interface. In this regard, the second display interface can comprise a second augmented reality display interface.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to situational navigation. The system 102 can comprise one or more of a variety of components, such as memory 104, processor 106, bus 108 (e.g., similar to system bus 1208), navigation component 110 and/or interface component 112. In various embodiments, the system 102 can be communicatively coupled to, or can further comprise, interface(s) 114. In various embodiments, one or more of the memory 104, processor 106, bus 108, navigation component 110, interface component 112, and/or interface(s) 114 can be communicatively or operably coupled (e.g., over a bus or wireless network) to one another to perform one or more functions of the system 102.

According to an embodiment, the navigation component 110 can, based on a route (e.g., or course) of a vehicle (e.g., vehicle 116), determine a navigational instruction (e.g., or navigational direction) to be displayed via an augmented reality interface (e.g., or a display interface or extended reality interface) (e.g., of the interface(s) 114) of the vehicle (e.g., a vehicle 116). In one or more embodiments, the route of the vehicle can be defined (e.g., entered into a global positioning system (GPS) of the vehicle 116) or can be determined (e.g., by the navigation component 110) based on current and/or historical trajectories of the vehicle 116. In various embodiments, the vehicle 116 can comprise a heads-up display (e.g., presented on or near a windshield of the vehicle 116) (see, e.g., FIG. 8), or another suitable type of extended reality interface (e.g., of the interface(s) 114). For example, in some embodiments, an extended reality interface of a vehicle 116 can utilize augmented reality goggles, though other embodiments need not utilize augmented reality goggles. In various implementations, an interface herein can comprise a digital gauge cluster of a vehicle 116 or another screen of the vehicle 116, viewable by a driver or another user of the vehicle 116.

It is noted that vehicle 116 can comprise any time of vehicle, such as a car, sport utility vehicle (SUV), hatchback, crossover, convertible, sedan, sports car, couple, minivan, van, bus, semi, pickup truck, truck, station wagon, motorcycle, bicycle, tricycle, scooter, moped, recreational vehicle (RV), semi-trailer truck, internal combustion engine (ICE) vehicle, hybrid vehicle, plug-in hybrid electric vehicle (PHEV), electric vehicle (EV), autonomous vehicle, hydrogen fuel-cell vehicle, natural gas vehicle (NGV), or another suitable vehicle. In various embodiments, the vehicle 116 can additionally or alternatively comprise or be representative of transportation on other mediums that can define fixed travel channels or paths, such as nautical travel and its respective vessels as boats, pontoons, fan boat, jet ski, ferry, water taxi, barge, tanker, sailboat, kayak, cruise ships, carriers, submarine, etc. Similarly another suitable medium can comprise air or space travel with respective vessels as airplanes, turbo-prop, jets, shuttles, air taxi, cruisers, probes, etc.

According to an embodiment, the interface component 112 can display the navigational instruction via the augmented reality interface (e.g., of the interface(s) 114). In various embodiments, the interface component 112 can display a virtual leading vehicle to be followed by the vehicle (e.g., followed by a virtual representation of the vehicle 116). In additional embodiments, instead of and/or in addition to the virtual leading vehicle, an alternate object (e.g., a virtual leading object) can be depicted. For example, the interface component 112 can display an arrow, an image, or another suitable object (e.g., a virtual leading object) to be followed by the vehicle (e.g., followed by a virtual representation of the vehicle 116). In some embodiments, the interface component 112 can generate a virtual representation of the vehicle on a virtual representation of a road (e.g., or travel channel or spatial volume) on which the vehicle travels. In this regard, the interface component 112 can display the virtual representation of the vehicle following the virtual leading vehicle. Such virtual leading vehicles can be associated with potential paths of the vehicle 116. In this regard, a virtual representation of the vehicle 116 can be displayed (e.g., the via interface component 112 on the interface(s) 114) moving from a current position to a future position. According to an embodiment, when multiple potential paths are displayed, different potential paths can be differentiated by different colors. Such colors can be based on defined safety or danger criteria, time to destination, traffic, road conditions (e.g., road hazards), weather, or other suitable factors.

According to an embodiment, the navigation component 110 can determine (e.g., based on a defined danger criterion) a danger level associated with the navigational instruction. In this regard, a color of the virtual leading vehicle can be determined (e.g., via the navigation component 110) based on the danger level. Such a defined danger criterion can be based on a probability of a collision (e.g., as determined by the navigation component 110 and/or via machine learning as later discussed in greater detail), probability of violating a driving rule or law, risk of damage to the vehicle 116, safety of a user or an occupant of the vehicle 116, a road condition (e.g., standing water, snow accumulation, damaged road, black ice, etc.), weather condition (e.g., low visibility, heavy rain, heavy wind, etc.), behavior of other vehicles (e.g., other than the vehicle 116) and/or corresponding drivers or users (e.g., reckless driving), traffic conditions, or other suitable factors.

According to an embodiment, the navigation component 110 can determine a capability of the vehicle 116. In this regard, the navigational direction can be further determined (e.g., via the navigation component 110) based on the capability of the vehicle 116. Such a capability can comprise one or more of a turning radius capability, four-wheel steering capability, acceleration capability, braking capability, autonomous driving capability, range capability (e.g., distance to empty on fuel or charge, total capable driving distance, etc.), water fording capability, breakover angle capability, departure angle capability, approach angle capability, articulation capability, tilt or incline capability, drive capability (e.g., four-wheel drive or all-wheel drive), towing capability, payload capability, seating capability, size (e.g., length, width, height, weight, ground clearance), or another suitable capability. For example, a smaller vehicle capable of a relatively tight turning radius can be determined to be capable of navigating on a dense urban street, while a large truck with a larger turning radius and larger footprint can be determined not to be capable of navigating on the dense urban street. In this regard, the navigation component 110 (e.g., of a smaller vehicle) can determine that the vehicle can travel on the dense urban street while the navigation component 110 (e.g., of the larger vehicle or truck) can determine that the vehicle cannot travel on the dense urban street. In this regard, a navigational instruction or direction herein can be based on the capability of the vehicle, and in this example, whether a size of the vehicle can allow or prevent a vehicle (e.g., vehicle 116) from navigating a particular street or route. If the navigation component 110 determines that the vehicle 116 can operate on a particular street or route, the navigation component 110 can consider that street or route for use by the vehicle 116 and corresponding navigation instructions or directions. Similarly, if the navigation component 110 determines that the vehicle 116 cannot operate on a particular street or route, the navigation component 110 can omit that street or route from navigational instructions or directions for the vehicle 116.

According to an embodiment, the navigation component 110 can, based on a road on which the vehicle travels or is instructed to travel and based on an attribute of the vehicle, determine a limitation of the vehicle. In some embodiments, the attribute can comprise a weight of the vehicle or a size of the vehicle. Such a limitation can comprise one or more of a turning radius limitation, four-wheel steering limitation, acceleration limitation, braking limitation, autonomous driving limitation, range limitation (e.g., distance to empty on fuel or charge, total capable driving distance, etc.), water fording limitation, breakover angle limitation, departure angle limitation, approach angle limitation, articulation limitation, tilt or incline limitation, drive limitation (e.g., two-wheel drive), towing limitation, payload limitation, seating limitation, size (e.g., length, width, height, weight, ground clearance), or another suitable limitation.

According to an embodiment, a system herein (e.g., system 102 or another system herein) can comprise one or more interface(s) 114. For example, the interface(s) 114 can comprise a first display interface (e.g., associated with a driver or driver seat of a vehicle 116) and a second display interface (e.g., associated with a passenger of the vehicle 116). In this regard, the interface component 112 can display (e.g., via the second display interface) a visualization associated with the route of the vehicle. Such a visualization can comprise a map comprising the route of the vehicle with respect to a current position and/or a destination, an advertisement or graphic associated with the destination and/or current position, a game associated with the destination and/or current position (e.g., playable via the interface and a control device, such as a smartphone or dedicated game controller).

Figure 2:
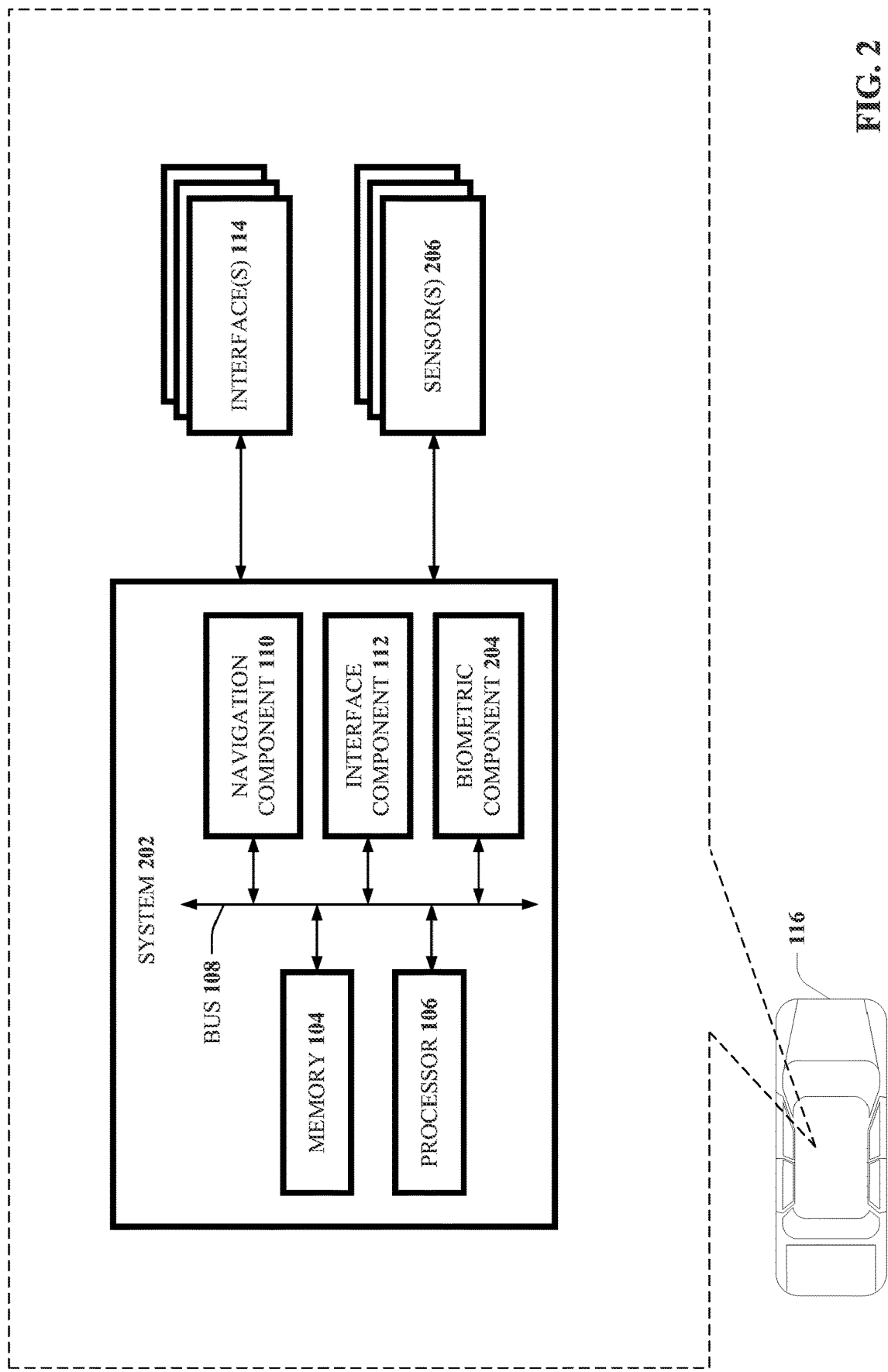
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to situational navigation. The system 202 can be similar to system 102, and can comprise one or more of a variety of components, such as memory 104, processor 106, bus 108, navigation component 110 and/or interface component 112. In various embodiments, the system 202 can be communicatively coupled to, or can further comprise, interface(s) 114. The system 202 can further comprise a biometric component 204. The system 202 can be further communicatively coupled to, or can further comprise, sensor(s) 206. In various embodiments, one or more of the memory 104, processor 106, bus 108, navigation component 110, interface component 112, interface(s) 114, biometric component 204, and/or sensor(s) 206 can be communicatively or operably coupled (e.g., over a bus or wireless network) to one another to perform one or more functions of the system 202.

It is noted that the vehicle 116 can comprise one or more sensor(s) 206. Such sensors can comprise one or more of a variety of sensors, such as a biometric sensor. Such biometric sensors can comprise one or more of heart rate sensor, fingerprint sensor, facial recognition sensor, pulse sensor, muscle activity sensor, voice recognition sensor, iris sensor, or another suitable biometric sensor. Other types of sensor(s) 206 can comprise one or more of an image sensor or camera (e.g., internal and/or external to the vehicle 116), glare sensor (e.g., spatial distribution of reflected light sensor), rain sensor (e.g., infrared sensor), light sensor, distance sensor, sonar sensor, radar sensor, Light Detection and Ranging (LiDAR) sensor, GPS sensor, ultrasonic sensor, wheel-speed sensor, oxygen sensor, knock sensor, acceleration sensor, yaw-rate sensor, temperature sensor, pressure sensor, or another suitable sensor. It is additionally noted that outputs of one or more sensors can be collectively utilized (e.g., via sensor fusion and/or a defined sensor fusion algorithm) by one or more components and/or systems herein.

According to an embodiment, a type of virtual leading vehicle (e.g., displayed on an interface 114) can be determined (e.g., by the biometric component 204) based on a biometric indicator of an occupant of the vehicle 116. For example, if a driver or another user of the vehicle 116 is determined to be frightened or angry (e.g., increased heart-rate, change in blinking, sweating, or otherwise determined) (e.g., via the biometric component 204 and an associated biometric sensor) a type of virtual leading vehicle can be modified. For example, if a driver of the vehicle is determined to be frightened, the virtual leading vehicle can be changed from a depiction of a vehicle (e.g., a depiction of the vehicle 116) to an image of a friend or of an animal, such as a cat or dog. Such a change can be intended to reduce a fear level of the driver or of the other user of the vehicle 116, for instance, to make the driver less afraid of following a navigational instruction herein (e.g., changing a lane). In another example, if the biometric component 204 determines (e.g., via a biometric sensor herein) that a user of the vehicle 116 is hungry (e.g., audible stomach growling), the virtual leading vehicle can be changed from a depiction of a vehicle (e.g., a depiction of the vehicle 116) to an image of food (e.g., a chicken nugget). Depictions or images herein (e.g., depictions or images to replace a depiction of a virtual leading vehicle) can be based on defined user preferences or settings, or can be learned (e.g., using machine learning as later discussed in greater detail). In another embodiment, the biometric component 204 can monitor not only a current driver (e.g., user), but additionally, or alternatively, other occupants of the vehicle 116 including, for instance, human passengers and/or animals. In yet another embodiment, if the vehicle 116 comprises a larger cargo transport vehicle (e.g., a semi, freight vehicle, shuttle, bus, cruise ship, etc.) or another suitable object transportation vehicle, feedback via the biometric component 204 can additionally or alternatively comprise responses from non-living components or objects that are sensitive to quick changes in acceleration, sustained vibrations, or noise or decibel levels to indicate that the vehicle 116 should proceed more slowly, or not exceed a maximum level of sustained vibration, as conveyed through the current road choice (e.g., a smooth, paved surface) versus a rough road choice (e.g., a rough, gravel covered surface).

According to an embodiment, the navigation component 110 can (e.g., via a sensor herein) determine a road sign, building, landmark and/or a corresponding position relative to the vehicle 116. In this regard, the navigation component 110 can base (e.g., or modify) a navigation instruction herein based on the road sign, building, or landmark and/or a corresponding position of the road sign, building, or landmark relative to the vehicle 116.

Figure 3:
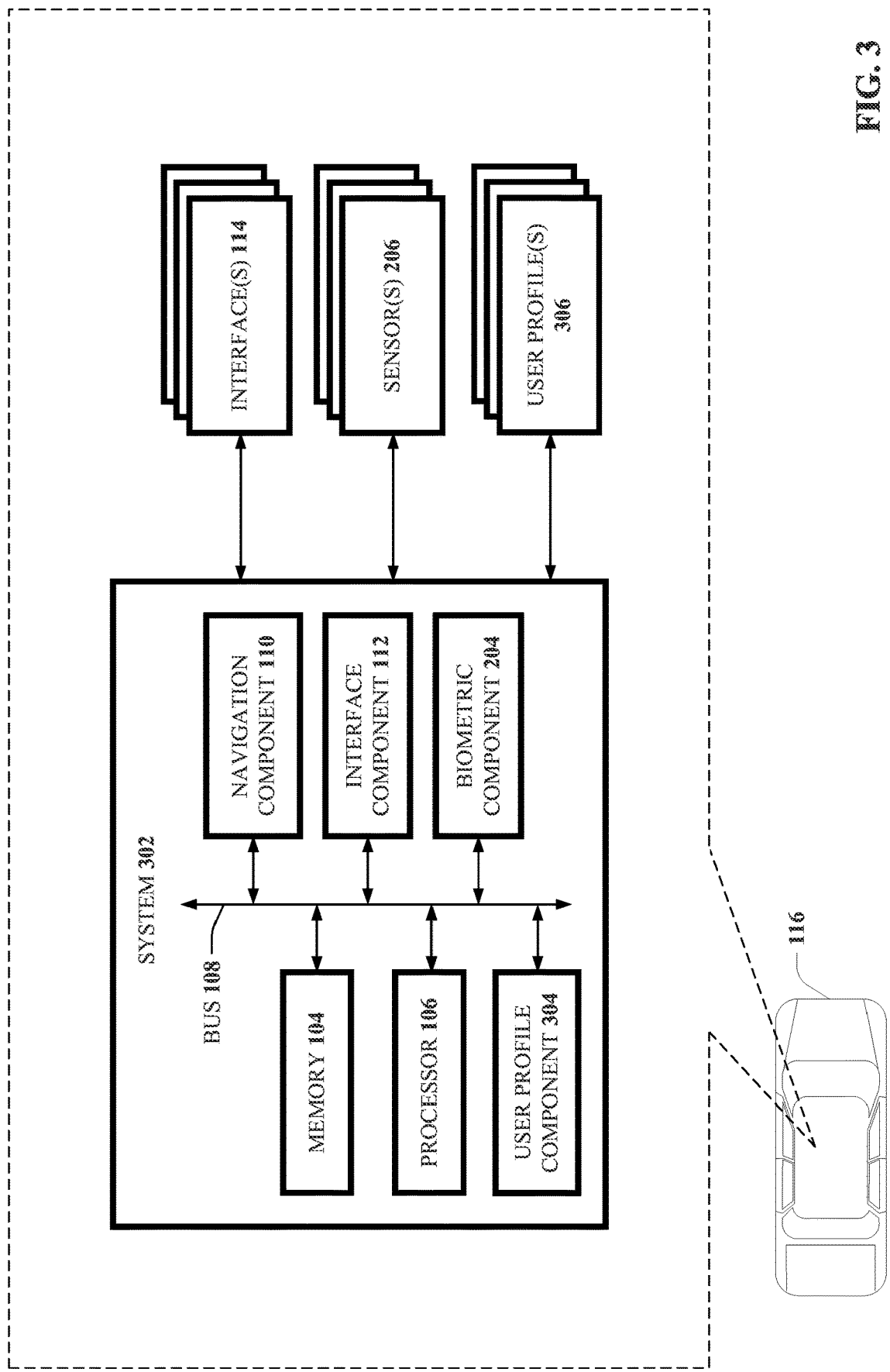
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to situational navigation. The system 302 can be similar to system 202, and can comprise one or more of a variety of components, such as memory 104, processor 106, bus 108, navigation component 110, interface component 112, and/or biometric component 204. In various embodiments, the system 302 can be communicatively coupled to, or can further comprise, interface(s) 114 and/or sensors 206. The system 302 can further comprise a user profile component 304. The system 302 can be further communicatively coupled to, or can further comprise, user profile(s) 306. In various embodiments, one or more of the memory 104, processor 106, bus 108, navigation component 110, interface component 112, interface(s) 114, biometric component 204, sensor(s) 206, user profile component 304, and/or user profile(s) 306 can be communicatively or operably coupled (e.g., over a bus or wireless network) to one another to perform one or more functions of the system 302.

According to an embodiment, a type of the virtual leading vehicle can be determined (e.g., by the user profile component 304) based on a preference associated with a user profile (e.g., of user profile(s) 306) registered with the vehicle 116. For example, the user profile component 304 can store one or more user profiles (e.g., of the user profile(s) 306). Such user profiles can correspond to registered users (e.g., drivers or passengers) of the vehicle 116. Such preferences herein can be associated with the type of virtual leading vehicle (e.g., displayed using the interface component 112). For example, such preferences can comprise a size of virtual leading vehicle, color of virtual leading vehicle, brightness of virtual leading vehicle, translucence of virtual leading vehicle, movement of virtual leading vehicle, animation of virtual leading vehicle, persistence of virtual leading vehicle, or another suitable preference associated with a virtual leading vehicle herein. Other preferences herein can comprise one or more of audio settings, visual settings, tactile feedback settings, seat position settings, climate control settings, autonomous driving settings, user interface settings, extended reality settings, or other suitable settings associated with a user and/or vehicle 116.

According to an embodiment, the system 302 can enhance or generate a danger level visualization (e.g., via the interface component 112) according to one of more changes in road conditions (e.g., a new obstacle or water level detected via the navigation component 110, sensor(s) 206, and/or another suitable component herein), behavior of other drivers (e.g., erratic lane changes), or traffic conditions (e.g., decreased or increased speed typical to the current (e.g., last minute) or historical (e.g., last month) average flow rate) over time based on historical actions of the vehicle 116. For example, transparency, color, texture, and/or other suitable patterns can be applied to a virtual leading vehicle or another visualization herein, for instance, to indicate immediacy or viability of certain navigational paths according to the computed danger level above with historical examples of driver hesitancy or performance criterion.

In another embodiment, the user profile component 304, interface component 112, and/or another suitable component herein can enable a user to select one or more different operational modes that can correlate to historical patterns that the user understands (e.g., is determined to understand). For example, a user can have a setting for "sport" mode, "educational" mode, "parental" mode, etc. that when enabled, can modify the performance of the vehicle 116 and/or and the user's expected response time or typical actions, for instance, according to respective historical performance, which can be encoded by the user profile component 304. In various embodiments, the system 402 (e.g., via the user profile component 304) can switch the currently utilized profile automatically or can allow a user to select the profile upon initialization or during execution.

Figure 4:
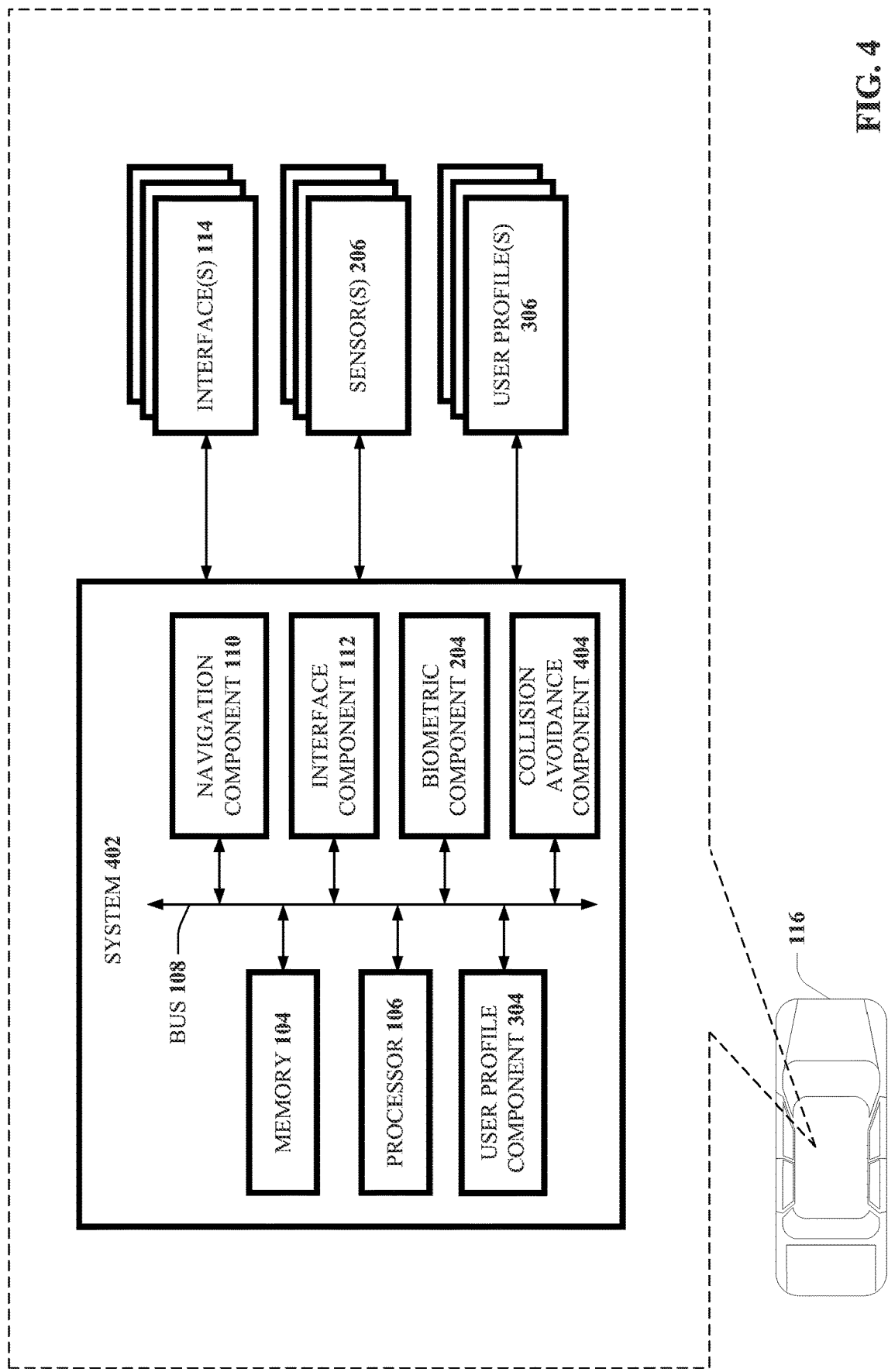
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to situational navigation. The system 402 can be similar to system 302, and can comprise one or more of a variety of components, such as memory 104, processor 106, bus 108, navigation component 110, interface component 112, biometric component 204, and/or user profile component 304. In various embodiments, the system 402 can be communicatively coupled to, or can further comprise, interface(s) 114, sensors 206, and/or user profile(s) 306. The system 402 can further comprise a collision avoidance component 404. In various embodiments, one or more of the memory 104, processor 106, bus 108, navigation component 110, interface component 112, interface(s) 114, biometric component 204, sensor(s) 206, user profile component 304, user profile(s) 306, and/or collision avoidance component 404 can be communicatively or operably coupled (e.g., over a bus or wireless network) to one another to perform one or more functions of the system 402.

According to an embodiment, the collision avoidance component 404 can, based on an output of a sensor (e.g., of the sensor(s) 206) of the vehicle 116, determine a potential collision. In this regard, a navigational instruction herein can be further based on the potential collision. For example, a sensor herein can be utilized to determine (e.g., by the collision avoidance component 404) that a vehicle in a lane adjacent to the vehicle 116 is driving erratically. The collision avoidance component 404 can then determine that there would exist a risk of a collision if, for instance, the vehicle 116 were to attempt to merge into the adjacent lane. In an embodiment, if the risk exceeds a defined risk threshold (e.g., a defined probability), the navigation component 110 can be prevented from generating a navigation instruction to the adjacent lane. Instead, the navigation component 110 can determine an alternate navigation instruction comprising a lower risk (e.g., below a defined risk threshold). In various embodiments, the collision avoidance component 404 can perform an automated collision avoidance maneuver. In this regard, the collision avoidance component 404 can perform automated braking, acceleration, or steering in order to avoid a collision with another vehicle or object.

Figure 5:
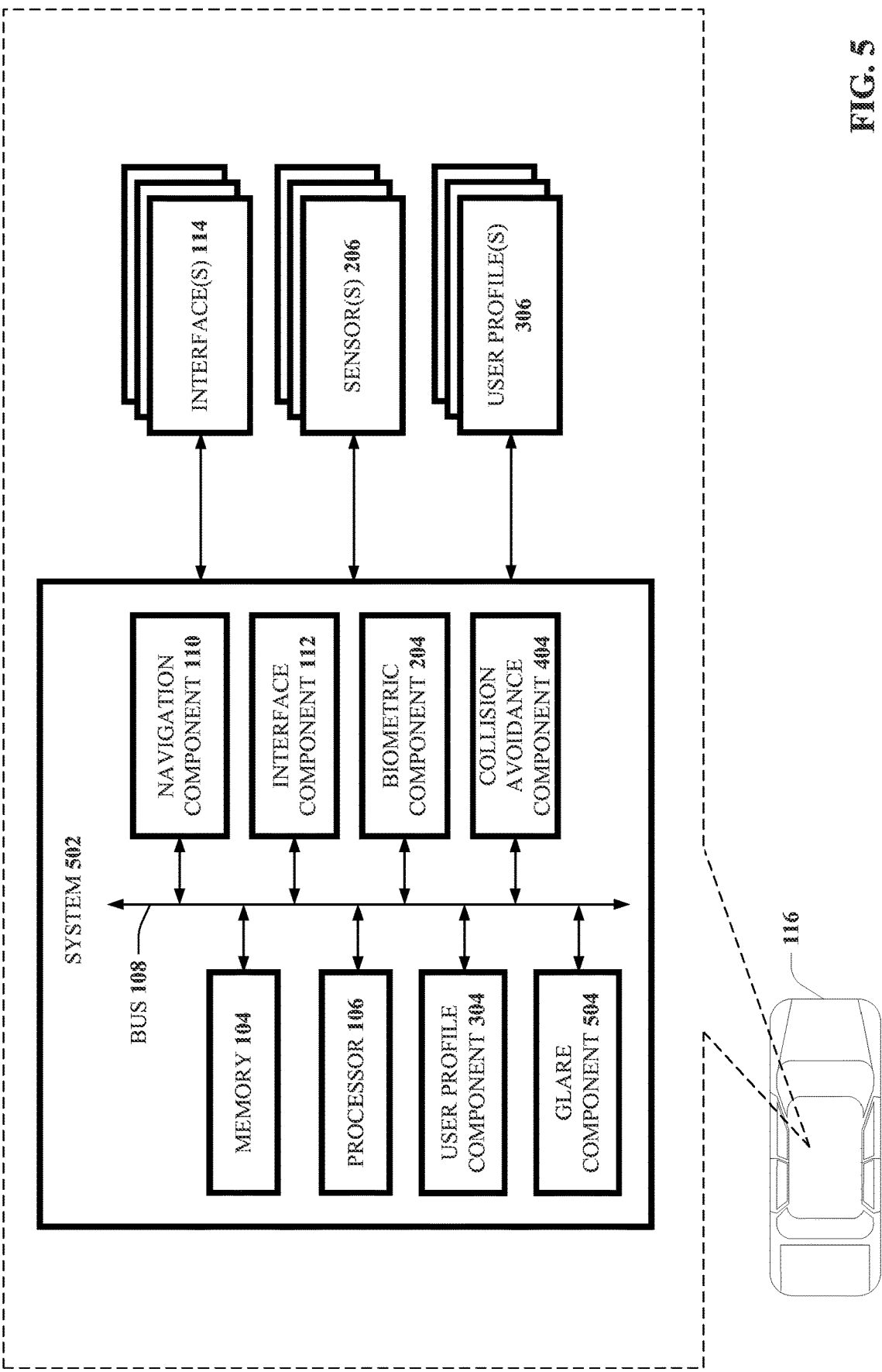
FIG. 5 is a block diagram of an exemplary system in accordance with one or more embodiments described herein.

Turning now to FIG. 5, there is illustrated an example, non-limiting system 502 in accordance with one or more embodiments herein. System 502 can comprise a computerized tool, which can be configured to perform various operations relating to situational navigation. The system 502 can be similar to system 402, and can comprise one or more of a variety of components, such as memory 104, processor 106, bus 108, navigation component 110, interface component 112, biometric component 204, user profile component 304, and/or collision avoidance component 404. In various embodiments, the system 502 can be communicatively coupled to, or can further comprise, interface(s) 114, sensors 206, and/or user profile(s) 306. The system 502 can further comprise a glare component 504. In various embodiments, one or more of the memory 104, processor 106, bus 108, navigation component 110, interface component 112, interface(s) 114, biometric component 204, sensor(s) 206, user profile component 304, user profile(s) 306, collision avoidance component 404, and/or glare component 504 can be communicatively or operably coupled (e.g., over a bus or wireless network) to one another to perform one or more functions of the system 502.

According to an embodiment, the glare component 504 can (e.g., based on an output of a sensor of the vehicle) determine a potential glare on a surface of the vehicle 116. In this regard, the navigation component 110 can further determine the navigational instruction based the potential glare on the surface of the vehicle 116. In various embodiments, the glare component 504 can utilize a sensor (e.g., of the sensor(s) 206) in order to determine glare or potential glare. For example, in such an embodiment, the sensor can comprise a spatial distribution of reflected light sensor or an infrared sensor in order to determine (e.g., via the glare component 504) a glare or potential glare on a surface of the vehicle 116. Such a surface of the vehicle can comprise a hood, windshield, mirror, window, interface or display, or another suitable surface of the vehicle 116. According to an example, if the glare component 504 determines that a glare exists or might exist on a surface of the vehicle 116, the navigation component 110 can modify a navigation instruction. In this regard, if the glare component 504 determines that a glare exists or might exist on a surface of the vehicle 116, the navigation component 110 can cause the interface component 112 to modify presentation of a navigation instruction (e.g., switch to an audio-based navigation instruction, since the driver might not be able to view a display surface or a heads-up display). In another example, if the glare component 504 determines that a glare exists or might exist on a surface of the vehicle 116, the navigation component 110 can switch the vehicle 116 to an autonomous driving mode, since the driver might not be able to view a display surface or a heads-up display.

Figure 6:
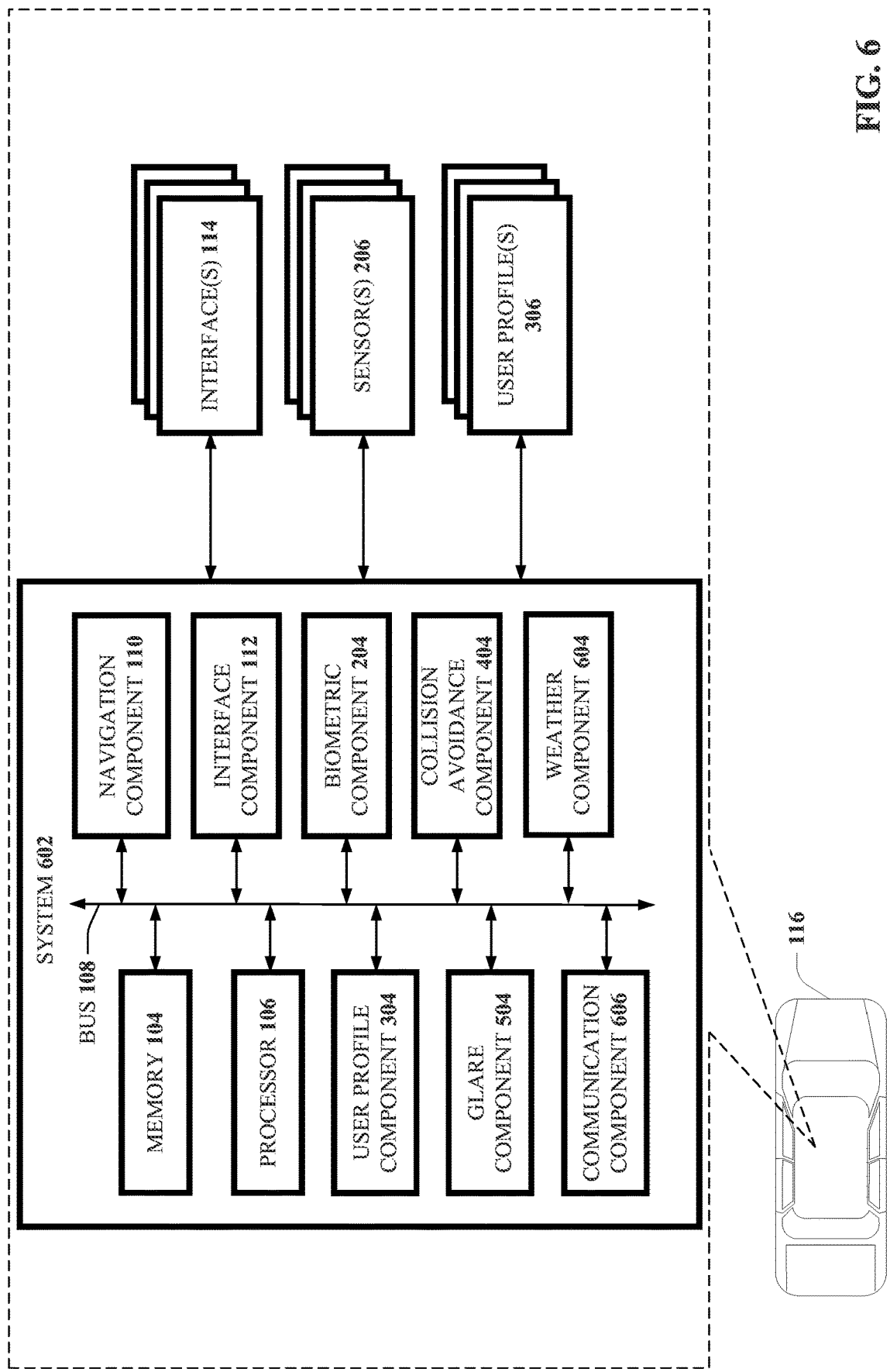
FIG. 6 is a block diagram of an exemplary system in accordance with one or more embodiments described herein.

Turning now to FIG. 6, there is illustrated an example, non-limiting system 602 in accordance with one or more embodiments herein. System 602 can comprise a computerized tool, which can be configured to perform various operations relating to situational navigation. The system 602 can be similar to system 502, and can comprise one or more of a variety of components, such as memory 104, processor 106, bus 108, navigation component 110, interface component 112, biometric component 204, user profile component 304, collision avoidance component 404, and/or glare component 504. In various embodiments, the system 602 can be communicatively coupled to, or can further comprise, interface(s) 114, sensors 206, and/or user profile(s) 306. The system 602 can further comprise a weather component 604 and/or communication component 606. In various embodiments, one or more of the memory 104, processor 106, bus 108, navigation component 110, interface component 112, interface(s) 114, biometric component 204, sensor(s) 206, user profile component 304, user profile(s) 306, collision avoidance component 404, glare component 504, weather component 604, and/or communication component 606 can be communicatively or operably coupled (e.g., over a bus or wireless network) to one another to perform one or more functions of the system 602.

According to an embodiment, the weather component 604 can determine a weather condition (e.g., along the route of the vehicle 116). In this regard, the navigational instruction can be further determined (e.g., by the navigation component 110) based on the weather condition. In various embodiments, the weather component 604 can utilize a sensor (e.g., of the sensor(s) 206) in order to determine the weather condition. For example, in such an embodiment, a sensor can comprise a spatial distribution of reflected light sensor or an infrared sensor in order to determine (e.g., via the weather component 604) a weather condition along the route of the vehicle 116. Such a weather condition can comprise, or can be based on, temperature, precipitation condition, humidity condition, cloudiness, atmospheric temperature, wind, or another suitable weather condition. According to an example, if the weather component 604 determines that a weather condition exists, or might exist, along the route of the vehicle 116, the navigation component 110 can modify a navigation instruction herein. In this regard, if the weather component 604 determines that determines that weather condition exists, or might exist, along the route of the vehicle 116, the navigation component 110 can determine that a particular navigation instruction might not be safe (e.g., too rapid of a lane change due to snowy conditions). In this regard, the navigation component 110 can determine an alternate navigation instruction (e.g., to be presented via the interface component 112). In another example, if the weather component 604 determines that a weather condition exists or might exist along the route of the vehicle 116, the navigation component 110 can switch the vehicle 116 to an autonomous driving mode, since the driver might not be able to view see a road (e.g., due to a snowy weather condition).

According to another embodiment, the communication component 606 can enable the vehicle 116 to communicate with other vehicles (e.g., other vehicles similar to the vehicle 116 or different vehicles), for instance, to share contextual information such that additional information about biometrics and/or user profiles can be integrated in computations (e.g., by the collision avoidance component 404). In an example, adjacent vehicle(s) (e.g., in the next lane, in front of the current vehicle, behind the current vehicle, etc.) can provide additional input to the collision avoidance component 404 and/or navigation component 110 pertaining to the safety or planned operation of adjacent vehicles or other suitable vehicles. In various embodiments, the system 602 can utilize or disregard this information according to respective responses (e.g., via the user profile component 304 or a performance criterion of the vehicle 116). In an example, the vehicle 116 can broadcast or share its own contextual information with adjacent vehicles in order to provide the same data described above, but in a reciprocal manner. According to an embodiment, the communication component 606 can receive weather information (e.g., from an external data source) and/or contextual information (e.g., from adjacent vehicles or traffic signals). In this regard, such weather information can comprise a weather condition herein, and such contextual information can comprise expected performance of other vehicles (e.g., via respective systems and/or sensors). Further in this regard, in response to receiving weather information (e.g., via the communication component 606), the navigation component 110 can modify a navigation instruction herein, or can base a navigation instruction on the weather condition. It is noted that the communication component 606 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

According to an embodiment, a display interface herein (e.g., of the interface(s) 114) can comprise a first display interface associated with a driver of the vehicle. In this regard, the interface component 112 can display, via a second display interface associated with a passenger of the vehicle, a visualization associated with a route of the vehicle (e.g., the vehicle 116). Such a visualization can comprise a map comprising the route of the vehicle 116 with respect to a current position and/or a destination, an advertisement or graphic associated with the destination and/or current position (e.g., of the vehicle 116), a game associated with the destination and/or current position (e.g., playable via the interface and a control device, such as a smartphone or dedicated game controller). According to an embodiment, the communication component 606 can receive request data representative of a request of a passenger of the vehicle 116. In this regard, a visualization herein can be further based on the request of the passenger of the vehicle. In various implementations, a display interface herein (e.g., the first display interface, second display interface, and/or another display interface herein) can comprise an augmented reality display interface.

Figure 7:
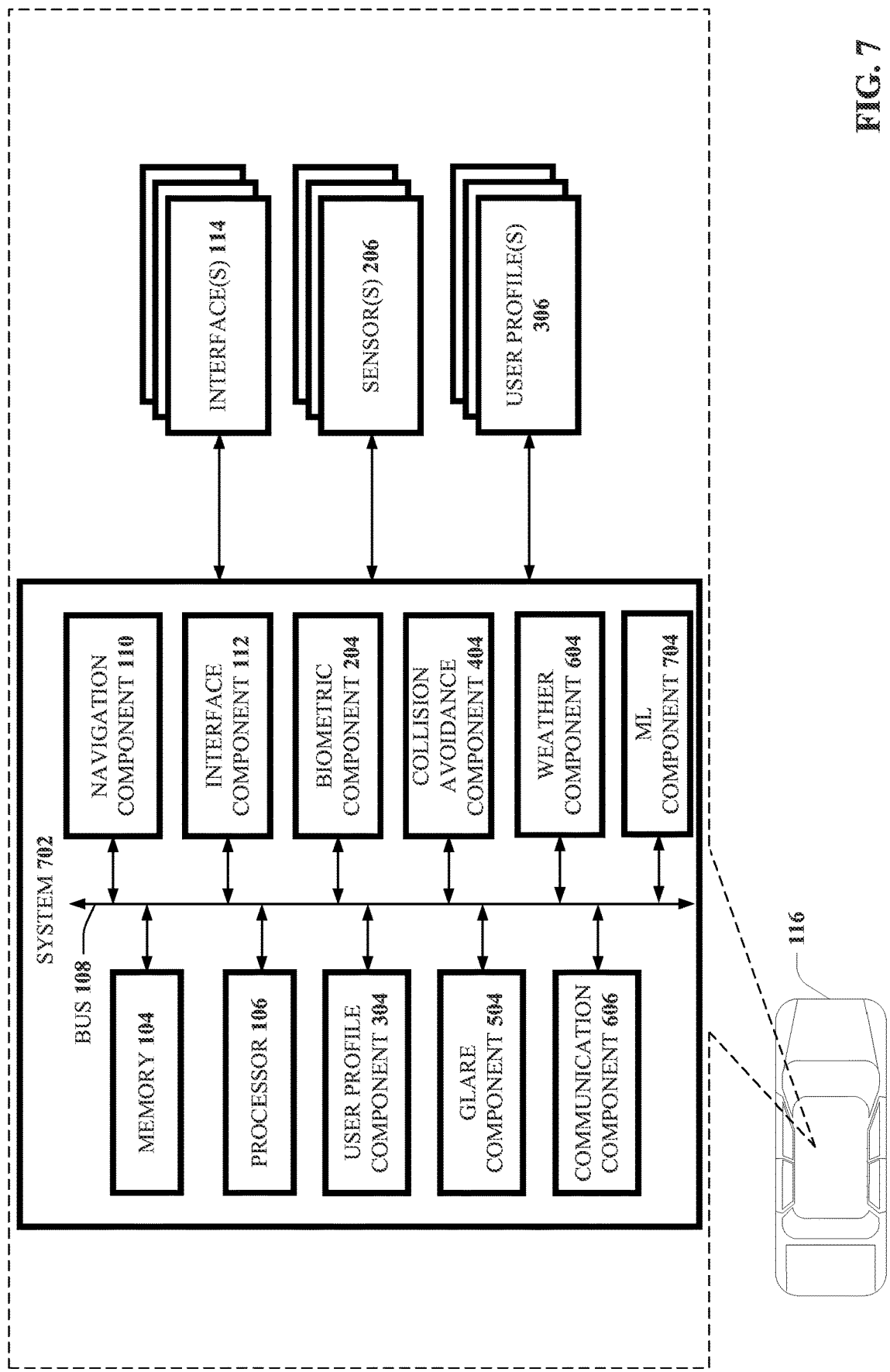
FIG. 7 is a block diagram of an exemplary system in accordance with one or more embodiments described herein.

Turning now to FIG. 7, there is illustrated an example, non-limiting system 702 in accordance with one or more embodiments herein. System 702 can comprise a computerized tool, which can be configured to perform various operations relating to situational navigation. The system 702 can be similar to system 602, and can comprise one or more of a variety of components, such as memory 104, processor 106, bus 108, navigation component 110, interface component 112, biometric component 204, user profile component 304, collision avoidance component 404, glare component 504, weather component 604, and/or communication component 606. In various embodiments, the system 702 can be communicatively coupled to, or can further comprise, interface(s) 114, sensors 206, and/or user profile(s) 306. The system 702 can further comprise a machine learning (ML) component 704. In various embodiments, one or more of the memory 104, processor 106, bus 108, navigation component 110, interface component 112, interface(s) 114, biometric component 204, sensor(s) 206, user profile component 304, user profile(s) 306, collision avoidance component 404, glare component 504, weather component 604, communication component 606, and/or ML component 704 can be communicatively or operably coupled (e.g., over a bus or wireless network) to one another to perform one or more functions of the system 702.

According to an embodiment, the ML component 704 can determine (e.g., based on a user profile of a user of the vehicle) a driver skill level. In this regard, the user profile can be generated (e.g., via the ML component 704) using a user profile model. Further in this regard, the user profile model can be generated (e.g., via the ML component 704) using machine learning based on past driving activities of one or more users of the vehicle and/or other users of other vehicles. In various embodiments, a driver skill level herein can be based on one or more of a variety of criteria, such as becoming lost, failing to obey traffic signs or signals, cutting off other drivers, straddling lanes, making unnecessarily wide turns, reacting slowly to emergencies, falling asleep behind the wheel, lacking attention, becoming easily angered or agitated (e.g., road rage), exercising poor judgment (e.g., not yielding right-of-way), neglecting to use mirrors or turn signals, neglecting to check for blind spots, poor distance judgment, or other suitable criteria. In various embodiments, the user profile (e.g., as generated by the ML component 704) can be compared (e.g., via the ML component 704) to other user profiles to determine driving proficiency of a given user profile to another.

According to an embodiment, the navigation component 110 can determine, based on the driver skill level (e.g., as determined via the ML component 704), whether to initiate automated navigation of the vehicle 116. In this regard, if the navigation component 110 determines that a driver possesses a low skill level (e.g., below a defined skill level threshold), the navigation component 110 can determine to initiate or execute automated navigation of the vehicle 116 (e.g., for a particular navigation instruction or for a different defined period of time). Alternatively, if the navigation component 110 determines that a driver possesses a higher skill level (e.g., above a defined skill level threshold), the navigation component 110 can determine not to initiate or execute automated navigation of the vehicle 116. In various embodiments, the navigation component 110 can compare driver skill level to an estimated required driver skill level for a particular navigational instruction (e.g., for each navigational instruction). In this regard, the navigation component 110 can determine whether or not to initiate automated navigation of the vehicle 116 for each navigational instruction (e.g., a turn, lane change, or another suitable navigational instruction). In further embodiments the determination (e.g., by the navigation component 110) of whether to initiate the automated navigation of the vehicle 116 can be further based on a current or predicted (e.g., by the navigation component 110 or ML component 704) road condition (e.g., e.g., standing water, snow accumulation, damaged road, traffic, etc.) along the route of the vehicle.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 704 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 704. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an ML component 704 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 704 can perform a utility-based analysis that factors cost of initiating the above-described operations versus benefit. In this embodiment, the ML component 704 can use one or more additional context conditions to determine various thresholds herein.

To facilitate the above-described functions, a ML component 704 herein can perform classifications, correlations, inferences, and/or expressions associated with principles of artificial intelligence. For instance, the ML component 704 can employ an automatic classification system and/or an automatic classification. In one example, the ML component 704 can employ a probabilistic and/or statistical-based analysis (e.g., factoring into the analysis utilities and costs) to learn and/or generate inferences. The ML component 704 can employ any suitable machine-learning based techniques, statistical-based techniques and/or probabilistic-based techniques. For example, the ML component 704 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 704 can perform a set of machine-learning computations. For instance, the ML component 704 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 8:
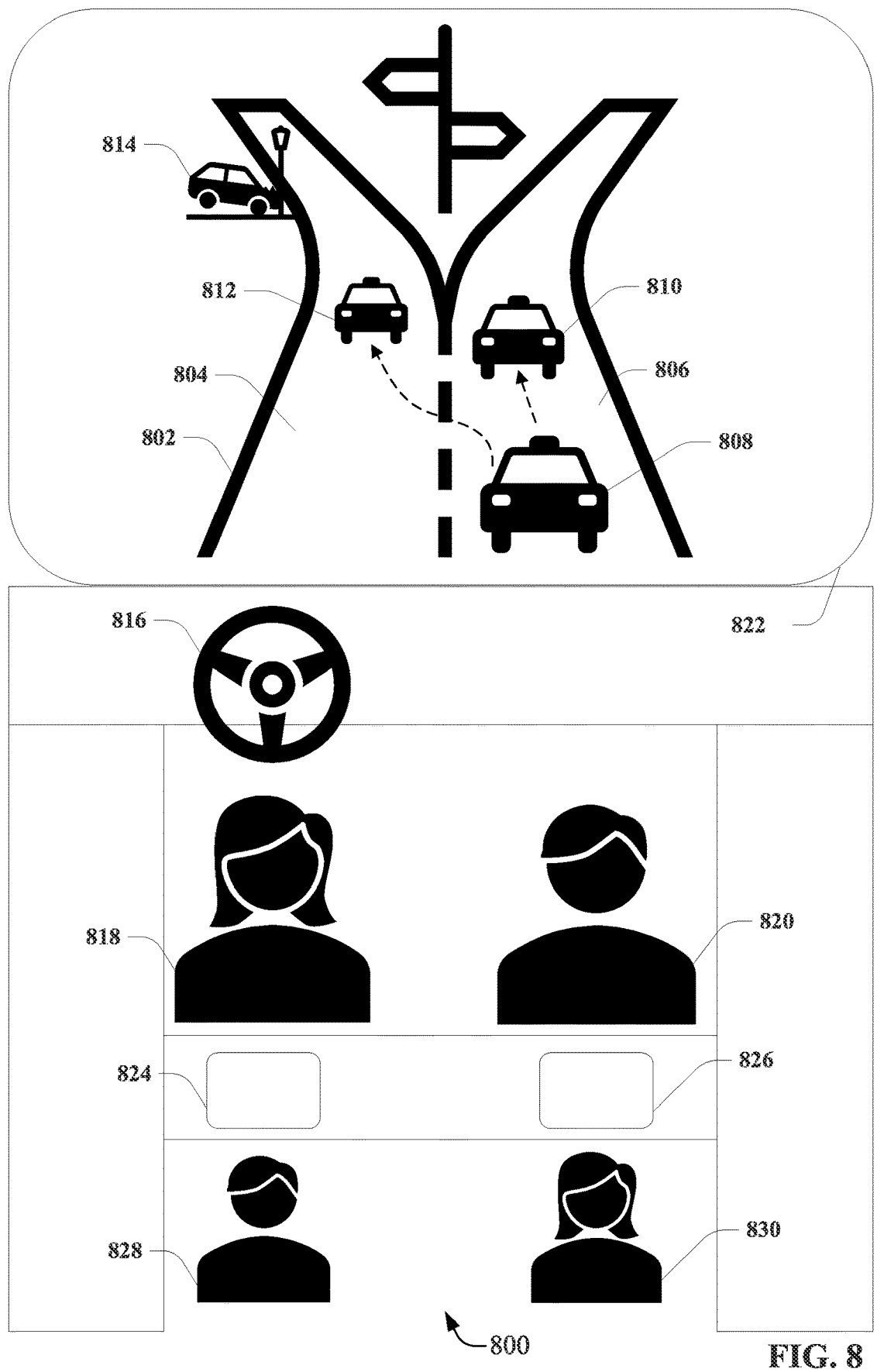
FIG. 8 is a diagram of an exemplary vehicle interior in accordance with one or more embodiments described herein.

FIG. 8 illustrates a diagram of an exemplary vehicle interior 800 in accordance with one or more embodiments described herein. In various embodiments, the vehicle interior 800 can comprise interface 822 (e.g., a windshield comprising a heads-up display), vehicle control(s) 816, user 818 (e.g., a driver), user 820 (e.g., a passenger), interface 824 (e.g., a display), interface 826 (e.g., a display), a user 828 (e.g., a rear-seat passenger), and/or a user 830 (e.g., a rear-seat passenger).

According to an embodiment, the interface 822 can display a navigation instruction associated with the vehicle 116. In this regard, the vehicle 808 can comprise a virtual representation of the vehicle 116. A road 802 can comprise a virtual representation of a road on which the vehicle 116 (and vehicle 808) travels. Vehicle 810 and/or vehicle 812 can comprise virtual leading vehicles. Such virtual leading vehicles herein can be associated with potential paths of the vehicle 808 (e.g., to follow a navigational instruction). In additional embodiments, the vehicle 810 and/or vehicle 812 can comprise virtual leading objects (e.g., arrow, image, or another suitable object), rather than virtual leading vehicles. In this regard, the vehicle 808 can be displayed (e.g., on the interface 822) moving from a current position (e.g., denoted by the vehicle 808) to a future position (e.g., denoted by the vehicle 810 and/or vehicle 812). According to an embodiment, when multiple potential paths are displayed (e.g., at the same time or one at a time), different potential paths can be differentiated by different colors. However, a singular potential path can also be denoted with a color. For example, following leading vehicle 812 into lane 804 can be determined to be a potentially dangerous situation (e.g., due to the collision 814), whereas remaining in lane 806 can be determined to be a safer situation. In this regard, vehicle 810 and the path between vehicle 808 and vehicle 810 can be illuminated in a color associated with a safe choice (e.g., illuminated green). Similarly, vehicle 810 and the path between vehicle 808 and vehicle 812 can be illuminated in a color associated with a dangerous choice (e.g., illuminated red). In additional embodiments, other aspects or objects (e.g., on an interface herein) can be colorized. For instance, an intelligent display (e.g., an interface herein) can comprise options such as colorized or tinting of an area, object-specific removal (e.g., or highlight), or specific macro-level visual guidance like barriers, lanes, etc.

Figure 9:
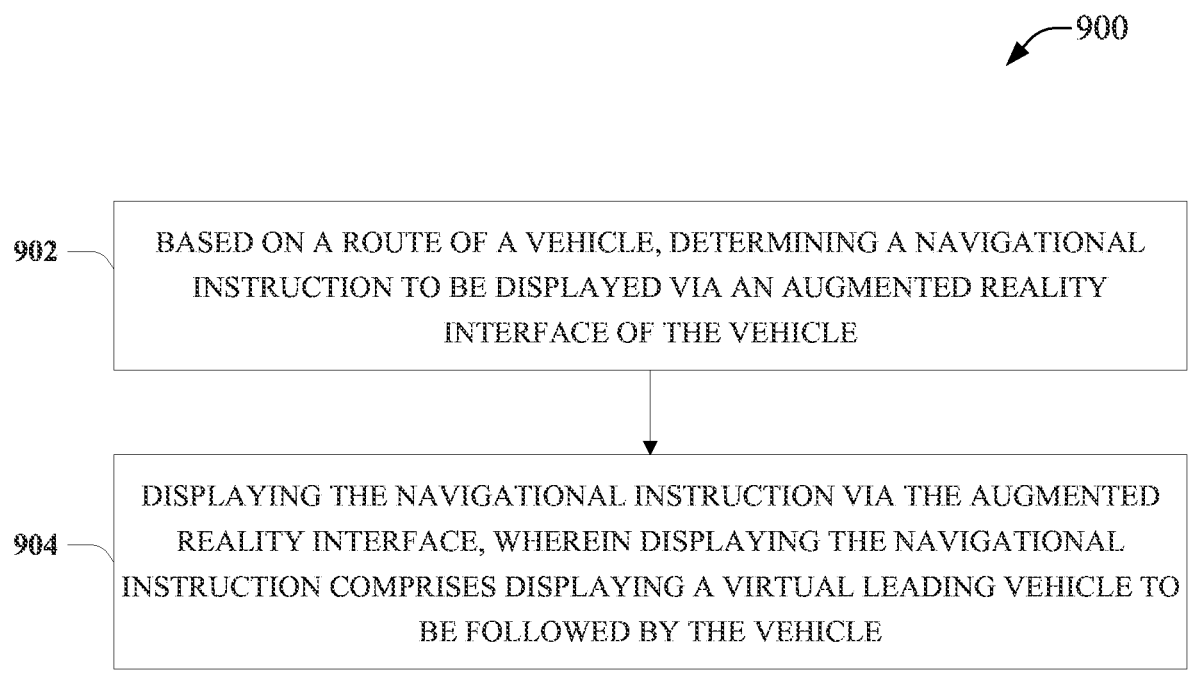
FIG. 9 is a block flow diagram for a process associated with situational navigation in accordance with one or more embodiments described herein.

FIG. 9 illustrates a block flow diagram for a process 900 associated with situational navigation in accordance with one or more embodiments described herein. At 902, the process 900 can comprise, based on a route of a vehicle, determining (e.g., via the navigation component 110) a navigational instruction to be displayed via an augmented reality interface (e.g., of the interface(s) 114) of the vehicle (e.g., vehicle 116). At 904, the process 900 can comprise displaying (e.g., via the interface component 112) the navigational instruction via the augmented reality interface (e.g., of the interface(s) 114), wherein displaying the navigational instruction comprises displaying a virtual leading vehicle to be followed by the vehicle.

Figure 10:
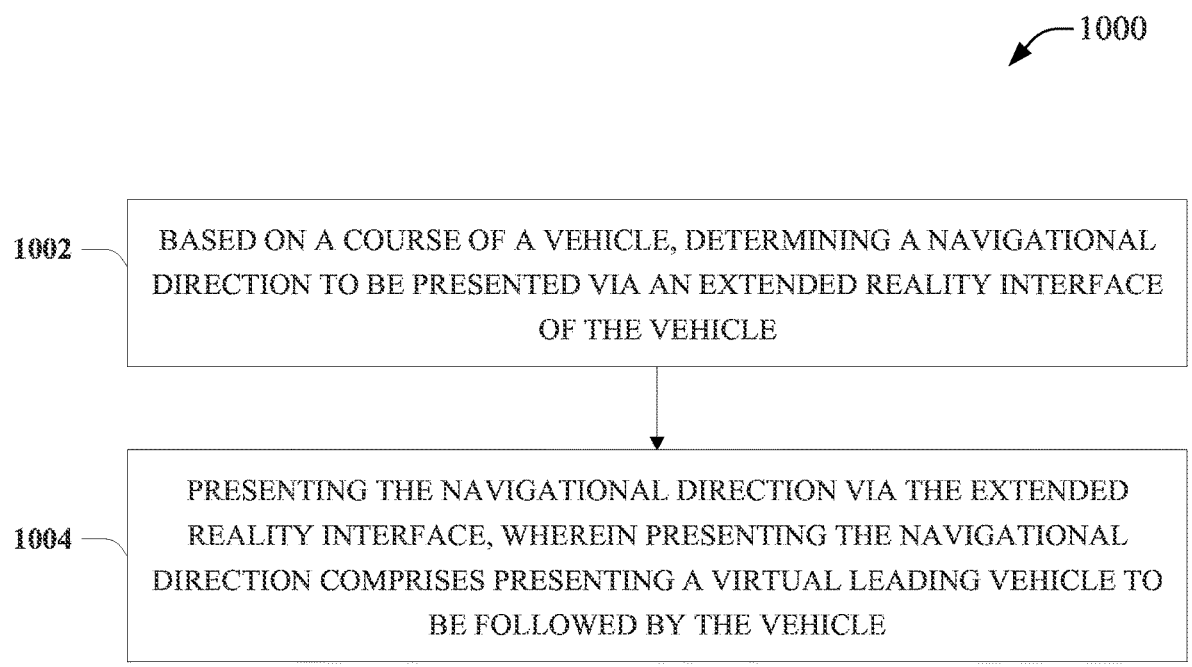
FIG. 10 is a block flow diagram for a process associated with situational navigation in accordance with one or more embodiments described herein.

FIG. 10 illustrates a block flow diagram for a process 1000 associated with situational navigation in accordance with one or more embodiments described herein. At 1002, the process 1000 can comprise, based on a course of a vehicle, determining (e.g., via the navigation component 110) a navigational direction to be presented (e.g., via the interface component 112) via an extended reality interface (e.g., of the interface(s) 114) of the vehicle (e.g., vehicle 116). At 1004, the process 1000 can comprise presenting (e.g., via the interface component 112) the navigational direction via the extended reality interface (e.g., of the interface(s) 114), wherein presenting the navigational direction comprises presenting a virtual leading vehicle to be followed by the vehicle.

Figure 11:
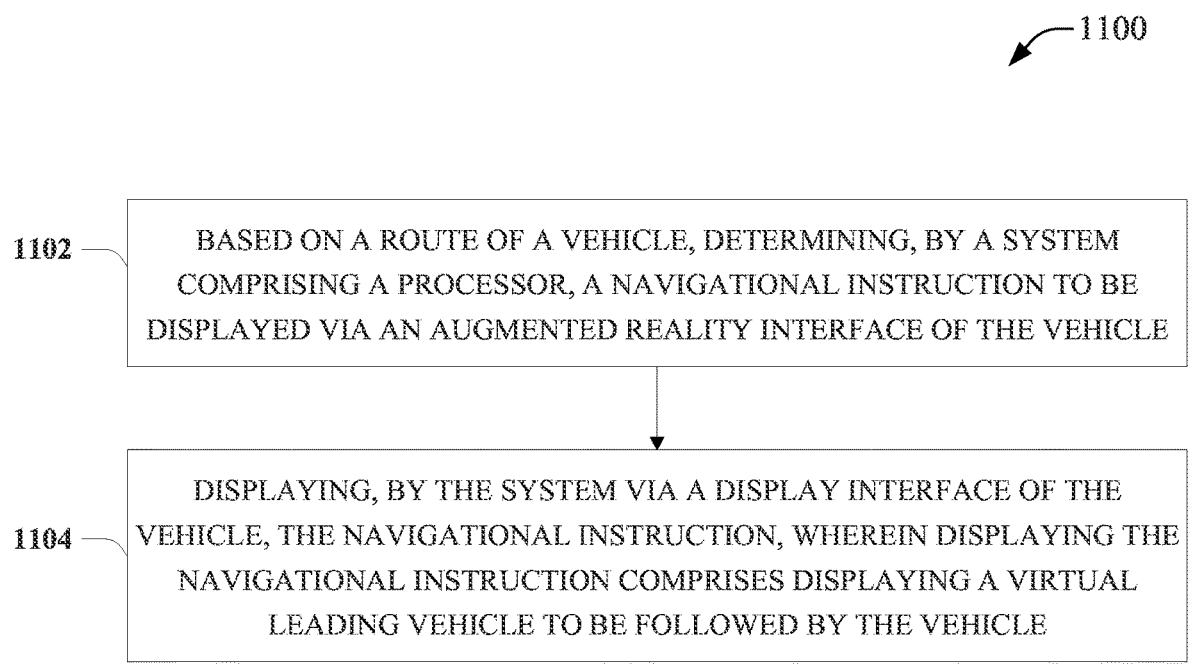
FIG. 11 is a block flow diagram for a process associated with situational navigation in accordance with one or more embodiments described herein.

FIG. 11 illustrates a block flow diagram for a process 1100 associated with situational navigation in accordance with one or more embodiments described herein. At 1102, the process 1100 can comprise, based on a route of a vehicle, determining, by a system comprising a processor (e.g., via the navigation component 110), a navigational instruction to be displayed via an augmented reality interface (e.g., of the interface(s) 114) of the vehicle (e.g., vehicle 116). At 1104, the process 1100 can comprise displaying, by the system via a display interface of the vehicle (e.g., via the interface component 112), the navigational instruction, wherein displaying the navigational instruction comprises displaying a virtual leading vehicle to be followed by the vehicle.

Figure 12:
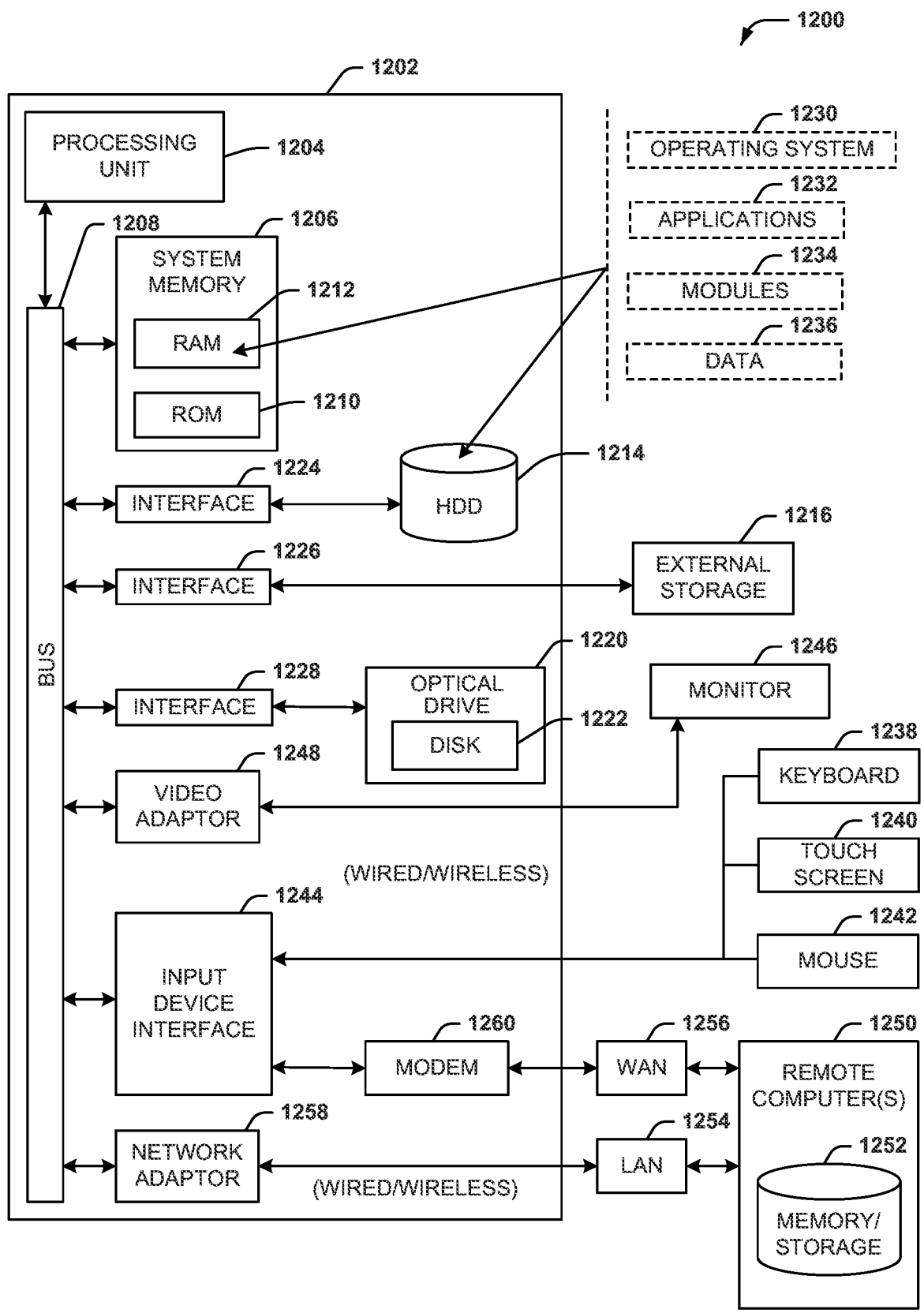
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
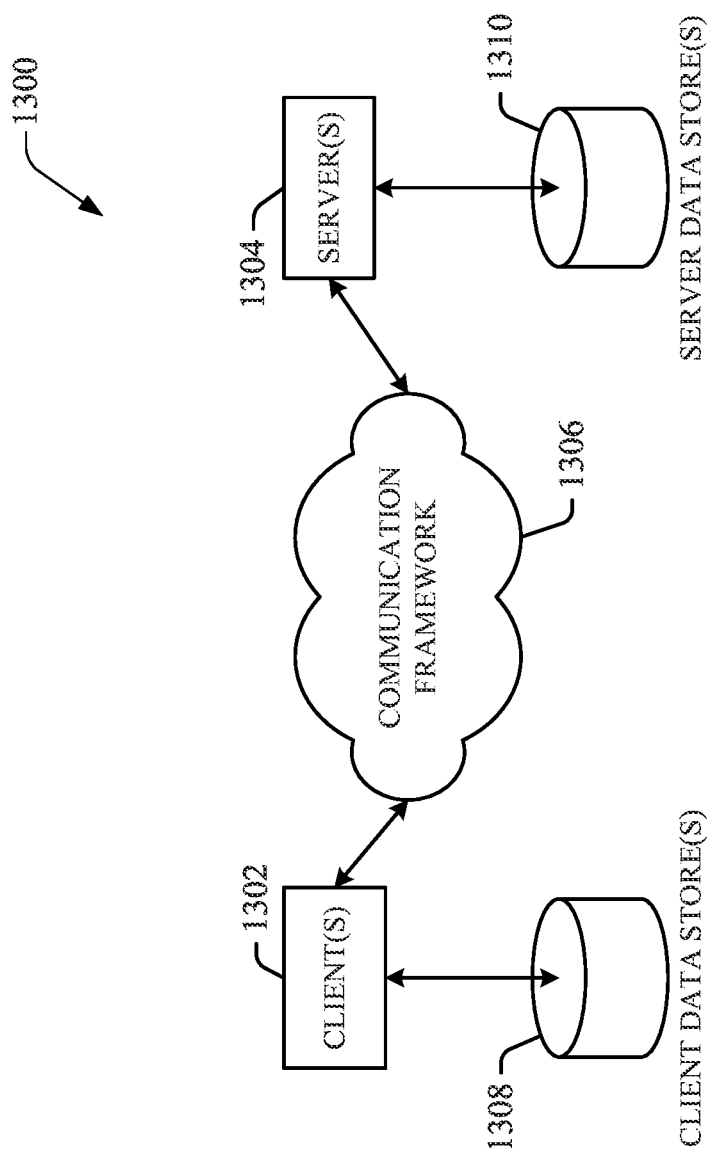
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processing system including a processor; and
a memory that stores executable instructions that, when executed by the processing system, facilitate performance of operations, comprising:
based on a defined route of a vehicle according to a current position and a destination, determining a navigational instruction associated with the defined route of the vehicle to be displayed via an augmented reality interface of the vehicle;
displaying a presentation of the navigational instruction via the augmented reality interface, wherein displaying the presentation of the navigational instruction comprises displaying a virtual leading object to be followed by the vehicle according to the defined route of the vehicle;
obtaining an output of a sensor of the vehicle, wherein the sensor comprises a spatial distribution of reflected light sensor;
determining a glare on a surface of the vehicle based on the output of the spatial distribution of reflected light sensor; and
in response to the determining the glare on the surface of the vehicle:
modifying the presentation of the navigational instruction; and
executing automated navigation of the vehicle.

2. The system of claim 1, wherein the sensor of the vehicle further comprises a biometric sensor, and wherein the obtaining an output of a sensor of the vehicle further comprises obtaining a biometric output from the biometric sensor, the operations further comprising:
determining from the biometric output, a condition of an occupant of the vehicle; and
determining a representation of the virtual leading object based on the condition of the occupant of the vehicle, wherein the displaying the presentation of the virtual leading object further comprises displaying the representation of a virtual leading vehicle.

3. The system of claim 1, wherein the operations further comprise:
obtaining a preference associated with a user profile registered with the vehicle; and
determining a representation of the virtual leading object based on the preference, wherein the displaying the presentation of the virtual leading object comprises displaying the representation of the virtual leading object.

4. The system of claim 1, wherein the operations further comprise:
based on an output of a sensor of the vehicle, determining a potential collision, and wherein the navigational instruction is further based on the potential collision.

5. The system of claim 1, wherein the modifying the presentation of the navigational instruction further comprises switching to an audio-based navigational instruction.

6. The system of claim 1, wherein the operations further comprise:
determining a weather condition along the defined route of the vehicle based on the output of the sensor of the vehicle; and
determining a modified navigational instruction based on the weather condition.

7. The system of claim 1, wherein the virtual leading object comprises a virtual leading vehicle, wherein the defined route of the vehicle comprises a road, and wherein the operations further comprise:
generating a virtual representation of the virtual leading vehicle on a virtual representation of the road, and wherein displaying the navigational instruction comprises displaying the virtual representation of the vehicle following the virtual leading vehicle on the road.

8. The system of claim 1, wherein the operations further comprise:
determining, based on a defined danger criterion, a danger level associated with the navigational instruction, and wherein a color of the virtual leading object is determined based on the danger level.

9. The system of claim 1, wherein the operations further comprise:
determining, based on a user profile of a user of the vehicle, a driver skill level, wherein the user profile has been generated using a user profile model, and wherein the user profile model has been generated using machine learning based on past driving activities of one or more users of the vehicle.

10. A non-transitory machine-readable medium, comprising executable instructions that, when executed by a processor, facilitate performance of operations, wherein the operations comprise:
based on a defined course of a vehicle according to a current position and a destination, wherein the vehicle is configured for transportation on a road, determining a navigational direction associated with the defined course to be presented via an extended reality interface of the vehicle;
presenting the navigational direction via the extended reality interface, wherein presenting the navigational direction comprises presenting a virtual leading object to be followed by the vehicle;
obtaining an output of a sensor of the vehicle, wherein the sensor comprises a spatial distribution of reflected light sensor;

determining a glare on a surface of the vehicle based on the output of the spatial distribution of reflected light sensor of the vehicle; and
in response to the determining the glare on the surface of the vehicle:
modifying the presentation of the navigational direction; and
executing automated navigation of the vehicle.

11. The non-transitory machine-readable medium of claim 10, wherein the operations further comprise:
based on a road on which the vehicle travels or is instructed to travel and based on an attribute of the vehicle according to operation of the vehicle on the road, determining a limitation of the vehicle according to operation of the vehicle on the road, and wherein the navigational direction is further based on the limitation of the vehicle.

12. The non-transitory machine-readable medium of claim 11, wherein the attribute comprises a weight of the vehicle or a size of the vehicle.

13. The non-transitory machine-readable medium of claim 10, wherein the operations further comprise:
determining a weather condition along the defined course of the vehicle based on the output of the sensor of the vehicle; and
determining a modified navigational instruction based on the weather condition.

14. A method, comprising:
based on a defined route of a vehicle according to a current position and a destination, determining, by a processing system comprising a processor, a navigational instruction associated with the defined route of the vehicle to be displayed via an augmented reality interface of the vehicle; and
displaying, by the processing system via a display interface of the vehicle, the navigational instruction, wherein displaying the navigational instruction comprises displaying a virtual leading object to be followed by the vehicle;
obtaining, by the processing system, an output of a sensor of the vehicle, wherein the sensor comprises a spatial distribution of reflected light sensor;
determining, by the processing system, a glare on a surface of the vehicle based on the output of the spatial distribution of reflected light sensor of the vehicle; and
in response to the determining the glare on the surface of the vehicle:
modifying the displaying of the navigational instruction; and
executing, by the processing system, automated navigation of the vehicle.

15. The method of claim 14, wherein the display interface comprises a first display interface associated with a driver of the vehicle, the method further comprising:
displaying, by the processing system via a second display interface associated with a passenger of the vehicle, a visualization associated with the defined route of the vehicle.

16. The method of claim 15, further comprising:
receiving, by the processing system, request data representative of a request of the passenger of the vehicle, wherein the visualization is further based on the request of the passenger of the vehicle.

17. The method of claim 15, wherein the visualization is further based on a destination of the vehicle.

18. The method of claim 15, wherein the first display interface comprises a first augmented reality display interface, and wherein the second display interface comprises a second augmented reality display interface.

19. The method of claim 14, further comprising:
determining, by the processing system, a weather condition along the defined route of the vehicle based on the output of the sensor of the vehicle; and
determining, by the processing system, a modified navigational instruction based on the weather condition.

20. The method of claim 14, further comprising:
based on a road on which the vehicle travels or is instructed to travel and based on an attribute of the vehicle according to operation of the vehicle on the road, determining, by the processing system, a limitation of the vehicle according to operation of the vehicle on the road, and wherein the navigational instruction is further based on the limitation of the vehicle.

\* \* \* \* \*